(12) United States Patent
Sercel et al.

(10) Patent No.: US 8,723,074 B2
(45) Date of Patent: May 13, 2014

(54) LASER MACHINING SYSTEMS AND METHODS WITH VISION CORRECTION AND/OR TRACKING

(75) Inventors: Jeffrey P. Sercel, Hollis, NH (US); Donald J. Lemmo, Manchester, NH (US); Terrence A. Murphy, Jr., Pembroke, NH (US); Lawrence Roberts, Londonderry, NH (US); Tom Loomis, Windham, NH (US); Miroslaw Sokol, Bedford, NH (US)

(73) Assignee: IPG Microsystems LLC, Manchester, NH (US)

( * ) Notice: Subject to any disclaimer, the term of this patent is extended or adjusted under 35 U.S.C. 154(b) by 735 days.

(21) Appl. No.: 12/576,508

(22) Filed: Oct. 9, 2009

(65) Prior Publication Data

US 2010/0089886 A1    Apr. 15, 2010

Related U.S. Application Data

(60) Provisional application No. 61/104,435, filed on Oct. 10, 2008.

(51) Int. Cl.
*B23K 26/08* (2006.01)

(52) U.S. Cl.
USPC ............................. 219/121.67; 219/121.72

(58) Field of Classification Search
USPC ....................................... 219/121.72, 121.67
See application file for complete search history.

(56) References Cited

U.S. PATENT DOCUMENTS

| | | | |
|---|---|---|---|
| 5,504,407 A | 4/1996 | Wakui et al. | |
| 5,739,502 A | 4/1998 | Anderson et al. | |
| 5,854,460 A | 12/1998 | Graf et al. | |
| 6,008,943 A | 12/1999 | Metelitsa | |
| 6,028,376 A | 2/2000 | Osanai et al. | |
| 6,087,625 A | 7/2000 | Iso | |
| 6,396,566 B2 | 5/2002 | Ebinuma et al. | |
| 6,430,465 B2 | 8/2002 | Cutler | |

(Continued)

FOREIGN PATENT DOCUMENTS

| CN | 101253018 A | 8/2008 |
|---|---|---|
| CN | 201105361 Y | 8/2008 |

(Continued)

OTHER PUBLICATIONS

International Search Report and Written Opinion dated Mar. 31, 2010 issued in related International Patent Application No. PCT/US2009/060153.

(Continued)

*Primary Examiner* — Zandra Smith
*Assistant Examiner* — Jamie C Niesz
(74) *Attorney, Agent, or Firm* — Grossman Tucker Perreault & Pfleger, PLLC

(57) ABSTRACT

Vision correction and tracking systems may be used in laser machining systems and methods to improve the accuracy of the machining. The laser machining systems and methods may be used to scribe one or more lines in large flat workpieces such as solar panels. In particular, laser machining systems and methods may be used to scribe lines in thin film photovoltaic (PV) solar panels with accuracy, high speed and reduced cost. The vision correction and/or tracking systems may be used to provide scribe line alignment and uniformity based on detected parameters of the scribe lines and/or changes in the workpiece.

23 Claims, 11 Drawing Sheets

(56) References Cited

U.S. PATENT DOCUMENTS

| | | |
|---|---|---|
| 6,531,867 B1 | 3/2003 | Greene et al. |
| 6,586,707 B2 | 7/2003 | Boyle et al. |
| 6,774,340 B1 | 8/2004 | Chiba et al. |
| 6,781,138 B2 | 8/2004 | Novak et al. |
| 6,909,735 B2 | 6/2005 | Lizotte et al. |
| 6,917,412 B2 | 7/2005 | Poon et al. |
| 6,919,530 B2 | 7/2005 | Borgeson et al. |
| 7,067,763 B2 | 6/2006 | Schramm |
| 7,321,418 B2 | 1/2008 | Sasaki et al. |
| 7,324,867 B2 | 1/2008 | Dinauer |
| 7,363,180 B2 | 4/2008 | Swaringen et al. |
| 2002/0003616 A1 | 1/2002 | Ebinuma et al. |
| 2002/0017511 A1 | 2/2002 | Kling |
| 2002/0056891 A1 | 5/2002 | Wu |
| 2002/0060210 A1 | 5/2002 | Terada et al. |
| 2003/0075529 A1 | 4/2003 | Mazumder et al. |
| 2003/0127441 A1 | 7/2003 | Haight et al. |
| 2004/0238507 A1 | 12/2004 | Schadler |
| 2005/0194365 A1* | 9/2005 | Li .................. 219/121.68 |
| 2005/0224475 A1* | 10/2005 | Nomaru .............. 219/121.82 |
| 2005/0247683 A1 | 11/2005 | Agarwal et al. |
| 2005/0274703 A1 | 12/2005 | Kawakita et al. |
| 2006/0289412 A1 | 12/2006 | Hamada |
| 2007/0103660 A1 | 5/2007 | Tanaka |
| 2007/0193990 A1 | 8/2007 | Richerzhagen et al. |
| 2008/0012189 A1 | 1/2008 | Manz |
| 2008/0067160 A1 | 3/2008 | Suutarinen |
| 2008/0099452 A1 | 5/2008 | Akiyama et al. |
| 2008/0105295 A1 | 5/2008 | Manz |
| 2008/0183332 A1 | 7/2008 | Ohm et al. |
| 2008/0192322 A1 | 8/2008 | Scaggs et al. |
| 2009/0000108 A1 | 1/2009 | Manz |
| 2009/0321397 A1* | 12/2009 | Krishnaswami et al. 219/121.68 |

FOREIGN PATENT DOCUMENTS

| | | |
|---|---|---|
| DE | 102007060658 | 7/2009 |
| GB | 2457720 | 8/2009 |
| WO | 2007078512 | 7/2007 |
| WO | 2009030409 | 3/2009 |
| WO | 2009098459 | 8/2009 |
| WO | 2009103946 | 8/2009 |
| WO | 2009103964 | 8/2009 |
| WO | 2009126899 | 10/2009 |

OTHER PUBLICATIONS

Westin, "Optimisation of Laser Scribing of Back Contact for Pholovoltaic Modules," Master of'-44 Science Program. Department of Applied Physics and Mechanicai Engineering Lulea University of Technology. 2005:102 CIV, ISSN: 1402-1617, ISRN; LTU-EX—05/102—SE. (2005).

International Search Report and Written Opinion dated Dec. 10, 2009 issued in related International Patent Application No. PCT/US2009/060182.

International Search Report and Written Opinion dated Dec. 3, 2009 issued in related International Patent Application No. PCT/US2009/060188.

International Search Report and Written Opinion dated Dec. 10, 2009 issued in related International Patent Application No. PCT/US2009/060228.

Photon International, "Focusing on Lasers," Sep. 2009, p. 208.

Schulze, et al., "Laser Direct Machining—Diversity is Key," Mikromaterialbearbeitung, LTJ Mar. 2008, Nr. 2, p. 38-39.

Dunsky, et al., "Scribing thin-film solar panels," (Feb. 2008) available at http://205.157.169.116/display_article/318855/39/ARCHI/none/Feat/Scribing-thin-film-solar-panels, retrieved on Sep. 3, 2008 (3 pages).

Dunsky, "Lasers in the solar energy revolution," (Aug. 2007) available at http://www.coherent.com/Downloads/70410-186e-ILS.pdf, retrieved on Sep. 3, 2008 (3 pages).

US Office Action dated Jun. 14, 2012 received in related U.S. Appl. No. 12/576,497.

US Office Action dated Jul. 19, 2012 received in related U.S. Appl. No. 12/576,963.

Chinese Office Action with English language Summary, issued Jun. 18, 2013 in corresponding Chinese Application No. 200980150144.2.

Chinese Office Action with English language Summary, issued Aug. 15, 2013 in corresponding Chinese Application No. 200980150143.8.

* cited by examiner

LASER MACHINING SYSTEMS AND METHODS WITH VISION CORRECTION AND/OR TRACKING

CROSS-REFERENCE TO RELATED APPLICATION

The present application claims the benefit of U.S. Provisional Patent Application Ser. No. 61/104,435, filed Oct. 10, 2008, which is fully incorporated herein by reference.

TECHNICAL FIELD

The present invention relates to machining and more particularly, to laser machining systems and methods with vision correction and/or tracking.

BACKGROUND INFORMATION

Laser machining systems and methods are commonly used to machine various types of materials and structures. Such laser machining systems and methods may provide a number of advantages including lower manufacturing costs, increased throughput and production yield, and improved quality. In the area of solar panels, for example, the advantages of laser machining could significantly enhance the efficiency and viability of solar energy technology.

In the manufacture of thin film photovoltaic (PV) solar panels, laser machining techniques may be used to scribe the various thin film layers in a panel to form electrically connected cells. In one type of PV solar panel, three layers are deposited to form the panel and lines are scribed after each new deposition. The area on the panel including these lines is considered a wasted area that does not contribute to solar energy conversion. Thus, the lines should be straight and aligned accurately to minimize this wasted area and to provide the best efficiency. High scribing speeds and increased throughput are also desirable. Providing accurate high speed scribing of thin film PV solar panels (and other similar structures) presents a number of unique challenges.

Large area workpieces, such as solar panels, may have variations in thickness and/or surface flatness and may have coating non-uniformities over the relatively large area, which may adversely affect machining of the workpiece. In particular, variations in the flatness of the workpiece may result in variations in the process distance from a beam delivery system, which causes changes in focus or demagnification of the laser on the workpiece. Variations in surface flatness and thickness and coating non-uniformities over relatively large processing distances may result in undesirable scribe variations such as variations in width, depth, fluence, heat-affected-zones and penetration, which can adversely affect the precision of the scribes. The relatively large scribing distance also increases the chances of errors in the scribe position and orientation on a large area workpiece.

Another challenge with laser machining of PV solar panels is the ability to maintain accuracy with the long working distance from the laser source to the workpiece. Angular pointing instability may result from the long working distance and longer beam delivery path. When the laser beam must travel longer distances to the workpiece and far-field scribing techniques are used, for example, the position of the laser spot focused on the workpiece can vary due to laser pointing variations, resulting in inaccuracies in line straightness and alignment.

BRIEF DESCRIPTION OF THE DRAWINGS

These and other features and advantages will be better understood by reading the following detailed description, taken together with the drawings wherein.

DETAILED DESCRIPTION

Vision correction and tracking systems, consistent with embodiments described herein, may be used in laser machining systems and methods to improve the accuracy of the machining. The laser machining systems and methods may be used to scribe one or more lines in large flat workpieces such as solar panels. In particular, laser machining systems and methods may be used to scribe lines in thin film photovoltaic (PV) solar panels with accuracy, high speed and reduced cost. The vision correction and/or tracking systems may be used to provide scribe line alignment and uniformity based on detected parameters of the scribe lines and/or changes in the workpiece. Various embodiments of such vision correction and tracking systems and methods are described in greater detail below.

As used herein, "machining" refers to any act of using laser energy to alter a workpiece and "scribing" refers to the act of machining a line on a workpiece by moving the laser and/or the workpiece linearly. Machining may include, without limitation, laser ablation scribing where the laser energy causes the material of the workpiece to ablate, laser recrystallization scribing where the laser energy causes the material of the workpiece to melt and recrystallize, and laser stealth scribing where the laser energy focused internally in the workpiece causes the workpiece to crack internally. As used herein, "flat" means having little curvature but not necessarily planar. As used herein, terms such as "substantially," "about," and "approximately" mean within acceptable tolerances. Various components of the laser machining systems described herein may also be used in systems for machining workpieces having other shapes.

Figure 1:
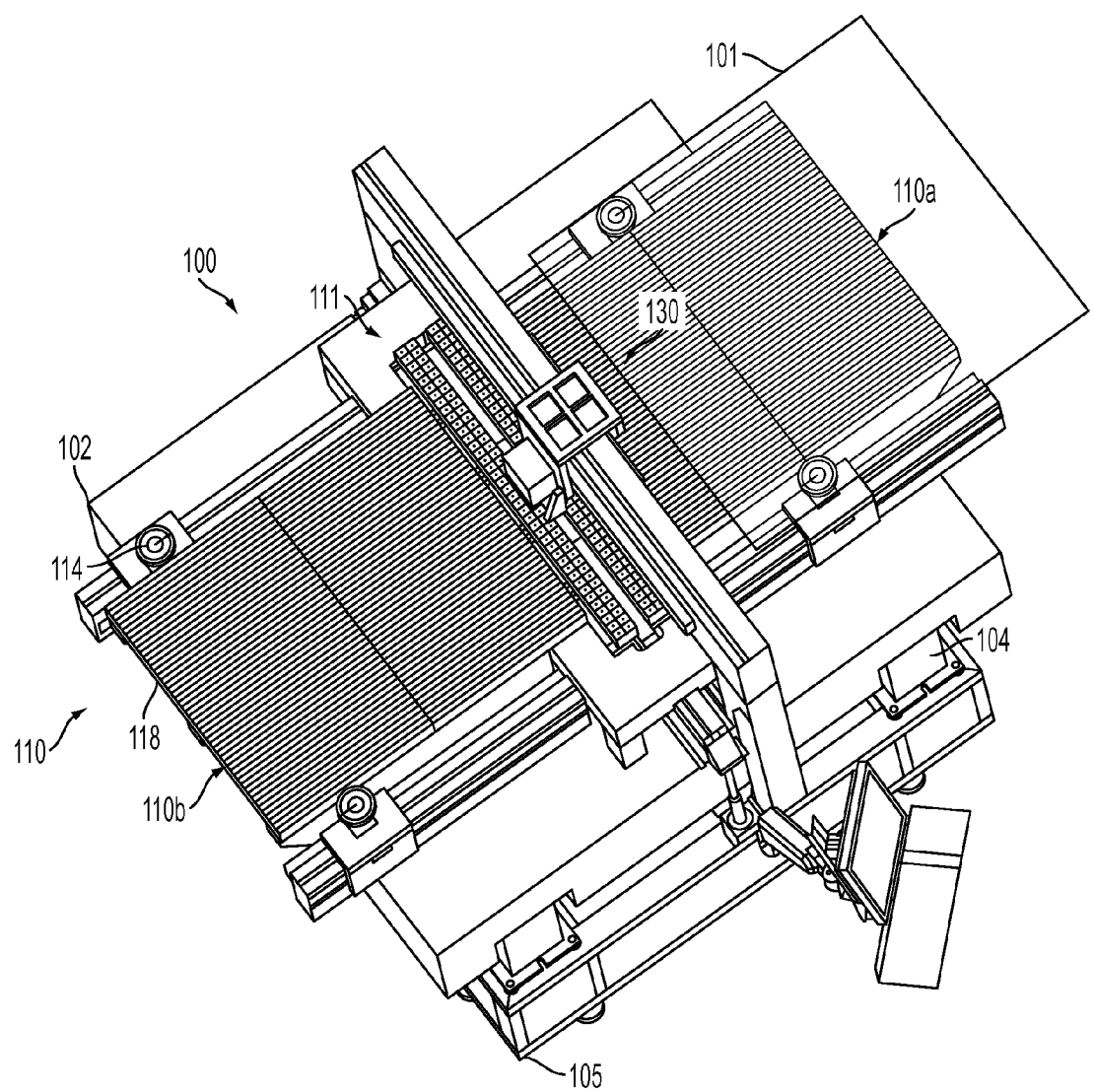
FIG. 1 is a top perspective view of a laser machining system, consistent with an embodiment.
Figure 2:
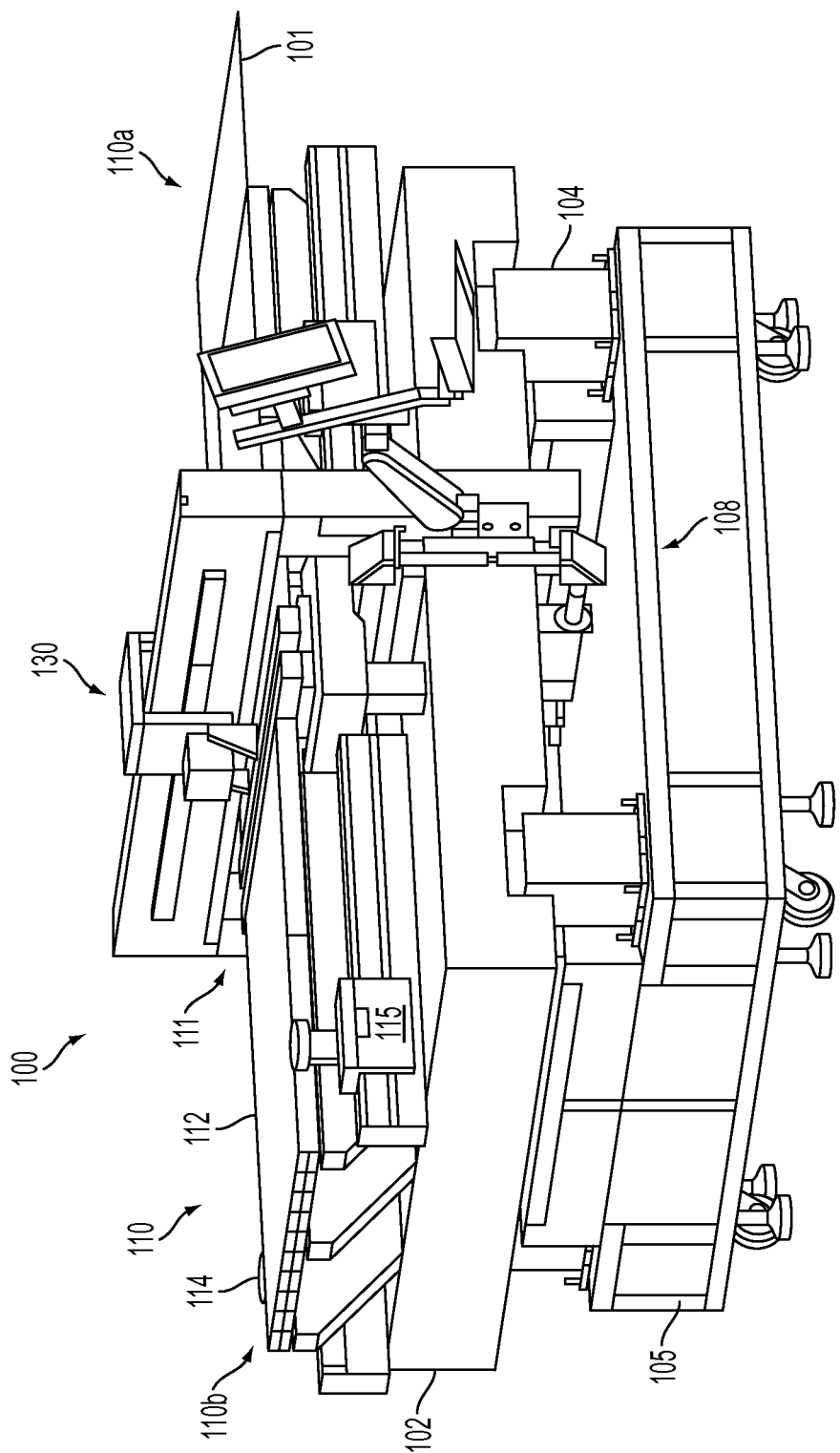
FIG. 2 is a partially cross-sectional perspective view of the laser machining system shown in FIG. 2 taken along an X axis.
Figure 3:
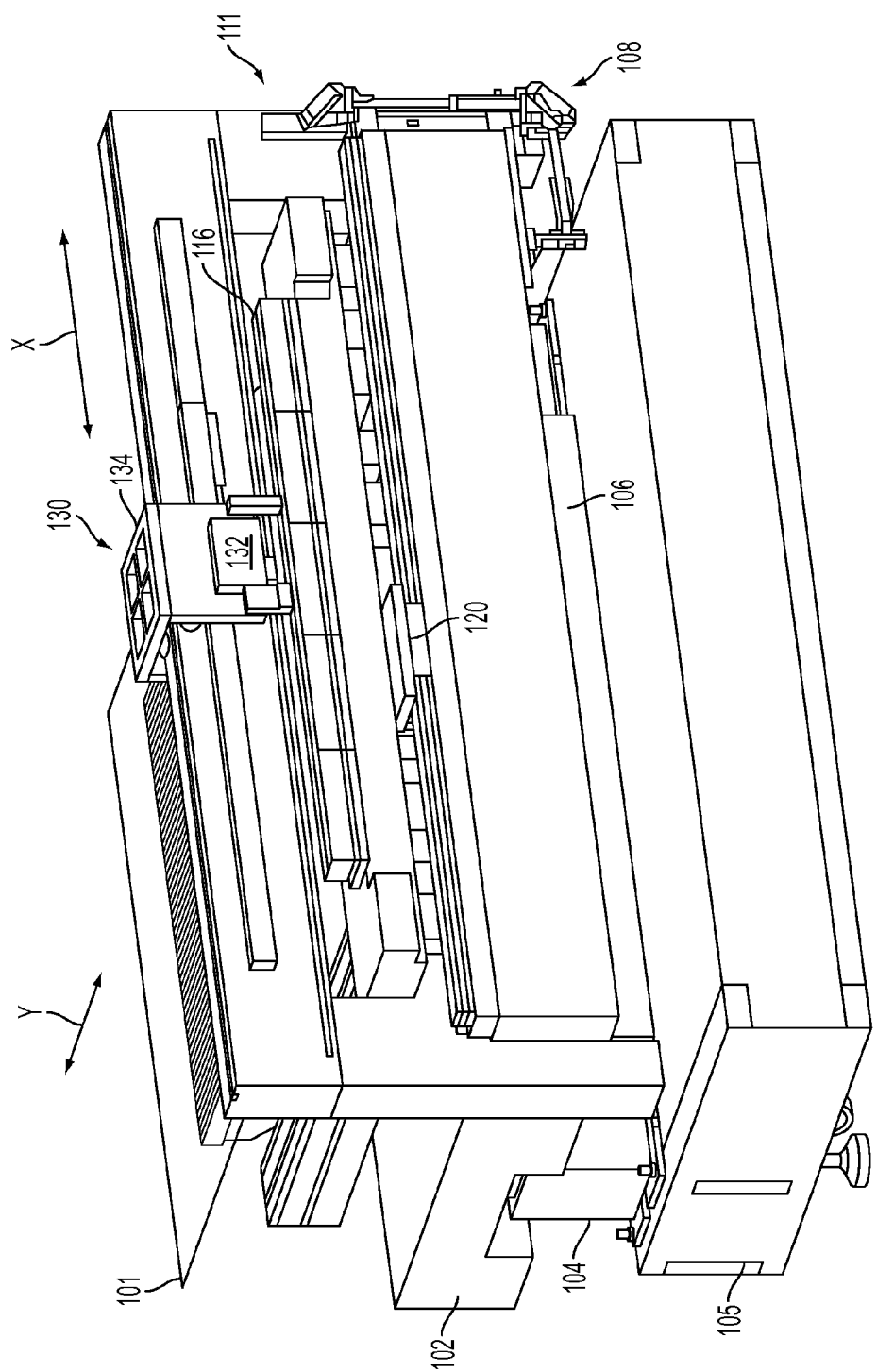
FIG. 3 is a partially cross-sectional perspective view of the laser machining system shown in FIG. 2 taken along a Z axis.

Referring to FIGS. 1-3, one embodiment of a laser machining system 100 is shown and described, which may include a multiple beamlet laser beam delivery system. The laser machining system 100 may include a base 102, such as a granite base, which is supported by a passive vibration isolation system 104. The base 102 may support and provide stability for various components of the laser machining system 100, such as a part handling system, optical heads, motion stages, and motion control systems, as described in greater detail below. The passive vibration isolation system 104 may include four passive isolators at each corner of the base 102 to isolate the laser machining system 100 from vibrations that may travel along the floor. In the illustrated embodiment, the isolators are positioned between the base 102 and a frame 105.

The laser machining system 100 may include a part handling system 110 for supporting a part or workpiece 101 and one or more laser scanning stages 120 supporting one or more optical heads (not shown) that direct one or more laser beams at the workpiece 101. The part handling system 110 may include an infeed section 110a and an outfeed section 110b on opposite sides of a process section 111. The part handling system 110 provides a workpiece support surface 112 for supporting the workpiece 101 and includes a motion control system for controlling motion of the workpiece along a workpiece axis (e.g., Y axis), for example, to index the workpiece 101 through the process section 111. In particular, the infeed section 110a may include an infeed conveyor and the outfeed section 110b may include an outfeed conveyor. The infeed section 110a moves the workpiece 101 into the process section 111 and the outfeed section 110b moves the workpiece 101 out of the process section 111.

In one embodiment, the part handling system 110 and workpiece support surface 112 may be capable of handling and supporting large panels (e.g., 1 m or greater across), such as the type used in thin film solar panels. One embodiment of the part handling system 110 may include one or more vacuum pucks or grippers 114 to hold the workpiece 101 (e.g., large glass panels of a solar panel) and positioning stage(s) to move the grippers 114. One or more of the vacuum grippers 114 may be mounted on an air bearing carriage 115 and may be independently controlled by an air bearing system to allow rotational control of the workpiece 101 for precision alignment. A stationary vacuum puck 116 may also hold the workpiece 101 in position during scribing in the process section 111.

An air bearing conveyor 118 may also be used to support the workpiece 101 and provide high speed indexing of the workpiece 101 during processing. A push-push air bearing (not shown) may also be used to support the workpiece 101 and prevent warping of the workpiece during processing. In a push-push air bearing, an upper air gantry (not shown) may be positioned over a lower air bearing conveyor, such as conveyor 118, such that air pushes the workpiece from both above and below.

In the process section 111, the laser scanning stage(s) 120 may be coupled to a laser scanning stage motion control system for moving the laser scanning stage(s) 120 linearly along one or more scanning axes (e.g., X axis). The scanning stage 120 (and optical head) may be positioned below the workpiece support surface 112 (and thus under the workpiece 101) such that the optical head directs the beam(s) upwardly at the workpiece 101 while the scanning stage 120 moves linearly along the scanning axis. The scanning stage 120 and motion control system may include a high speed precision air bearing system, for example, capable of speeds up to about 2.5 msec or greater. A force cancellation technique or mechanism may be used to cancel or minimize reaction forces caused by the movement of the scanning stage(s) 120 and optical head(s). Examples of force cancellation techniques and mechanisms that may be used are described in greater detail in U.S. patent application Ser. No. 12/576,497 entitled LASER MACHINING SYSTEMS AND METHODS WITH MOVING LASER SCANNING STAGE(S) PROVIDING FORCE CANCELLATION, which is filed concurrently herewith and fully incorporated herein by reference.

The laser machining system 100 also includes one or more laser sources 106 that generate one or more raw laser beams and a beam delivery system that modifies and routes laser beam(s) to the workpiece 101. The laser wavelength may be selected based on the layer and type of material to be scribed and may include, for example, wavelengths of 1064 nm, 352 nm, 355 nm, or 266 nm. The laser source(s) 106 may be located below the base 102 and may be mounted on a fast access service module to minimize down time during service intervals. The beam delivery system may modify the beam by controlling the shape, size, uniformity and/or strength of the beam that is routed to the workpiece 101.

The beam delivery system may include a stationary segment 108 located on the frame 105 and/or base 102 and a movable segment located on or in the moveable optical head (not shown) on the laser scanning stage(s) 120. The stationary segment 108 of the beam delivery system may include, for example, a series of lenses, mirrors and/or reflectors, used to direct the laser beam(s) from the laser source 106 into the movable segment of the beam delivery system. The minors or reflectors in the stationary segment 108 of the beam delivery system may be fast steering mirrors that are capable of changing the direction of the beam(s) directed into the optical heads, which may be used for beam tracking and/or for locking the laser to improve pointing stability.

The stationary segment 108 of the beam delivery system may also include a beam expander for expanding the beam and a power meter for measuring a power of the beam. The beam expander can change both the shape and the size of the beam and may include an arrangement of spherical lenses that allow for independent adjustment of both beam expansion ratio and divergence compensation. The power meter may be retractable, for example, using a pneumatic actuator, such that the power meter may be moved into the path of the beam to measure power readings. A retractable beam stop may also be moved into and out of the beam path (e.g., using pneumatic actuator). The retractable beam stop may include a mirror that redirects the beam into a water cooled beam dump to prevent the beam from passing into the optical head.

As will be described in greater detail below, the moveable segment of the beam delivery system receives a laser beam, modifies the laser beam, and directs one or more modified laser beams to the workpiece. In one embodiment, the beam delivery system splits a beam into multiple beamlets to scribe multiple lines simultaneously to get a higher throughput and uses homogenizers and/or imaging optics to make the beam less sensitive to angular pointing instability and to improve accuracy.

The laser machining system may also include a debris control system 130 for collecting and removing debris generated by machining the workpiece 101. In particular, the debris control system 130 may remove debris generated from scribing toxic materials, such as GaAs, and other materials used in thin film solar panels. The debris control system 130 may include a movable debris collection module or head 132 mounted on a debris control motion stage 134 above the workpiece support surface for linear movement with the laser scanning stage 120 and optical head. The debris control motion stage 134 may be controlled by a motion control system and slaved to the motion of the scanning stage 120. In particular, the debris control motion stage 134 may be an air bearing linear motor driven stage.

The laser machining system 100 may further include air filtration systems and outgassing systems to filter and recycle air within the enclosure. An enclosure (not shown) may be located around the laser machining system 100 and air filtration systems (not shown) may be located on the enclosure. The air filtration systems filter the air to remove harmful gases and direct the filtered air back into the processing area within the enclosure. Examples of debris control and extraction systems and methods that may be used are described in greater detail in U.S. patent application Ser. No. 12/576,963 entitled LASER MACHINING SYSTEMS AND METHODS WITH DEBRIS EXTRACTION, which is filed concurrently herewith and fully incorporated herein by reference.

The laser machining system 100 may also include tracking systems and/or vision inspection systems (not shown) for precision alignment of the workpiece prior to scribing and/or for tracking and/or inspection during and/or after scribing. One or more sensors or inspection cameras may be mounted on the debris control motion stage 134 or another motion stage that moves with the laser scanning stage 120. The laser machining system may also include computerized control systems including control software that integrates the laser, motion control, digital input/output, tracking, and optional machine vision inspection. Embodiments of the tracking systems and vision inspection systems are described in greater detail below.

Figure 4A:
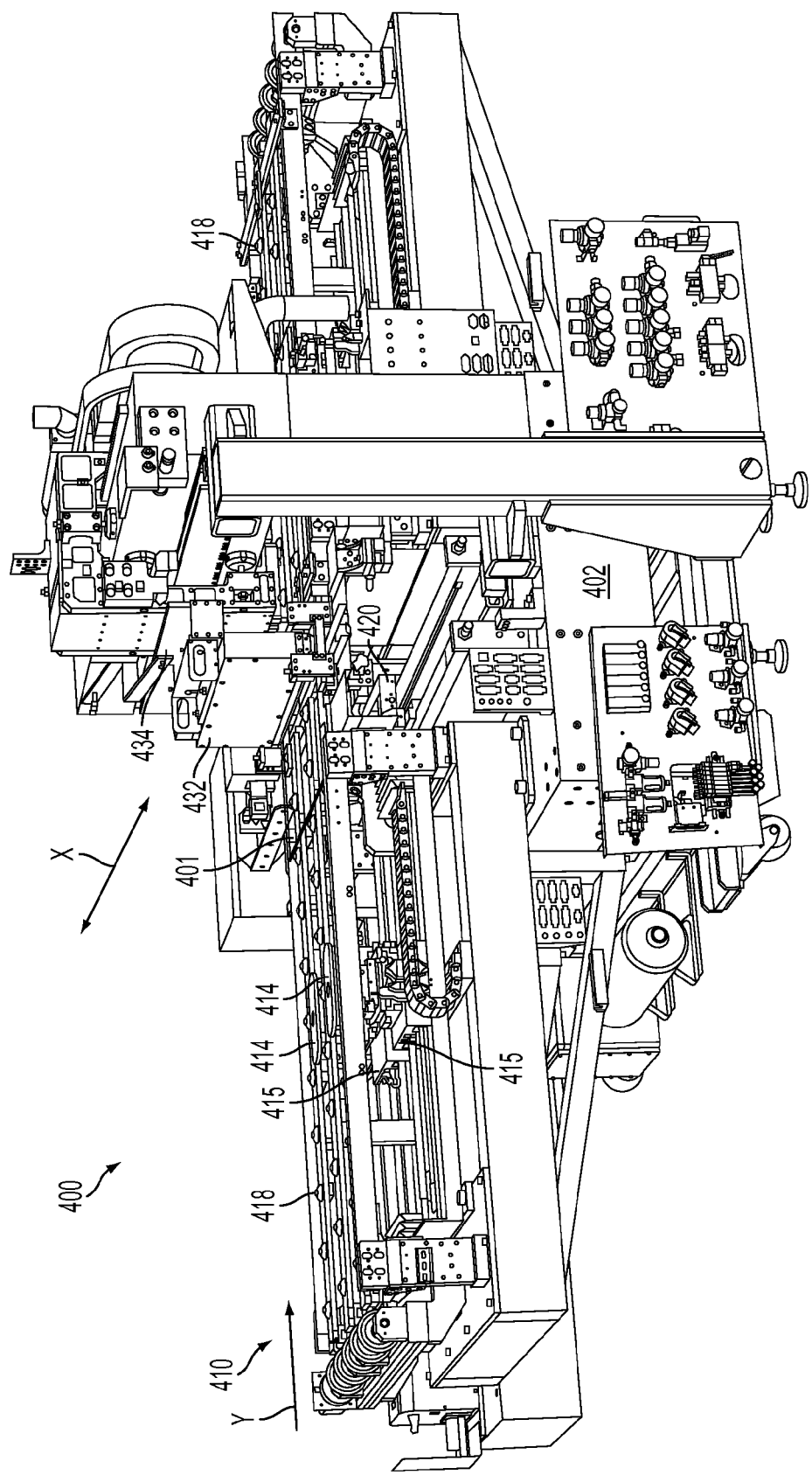
FIGS. 4A and 4B are front and back perspective views of a laser machining system, consistent with another embodiment.
Figure 4B:
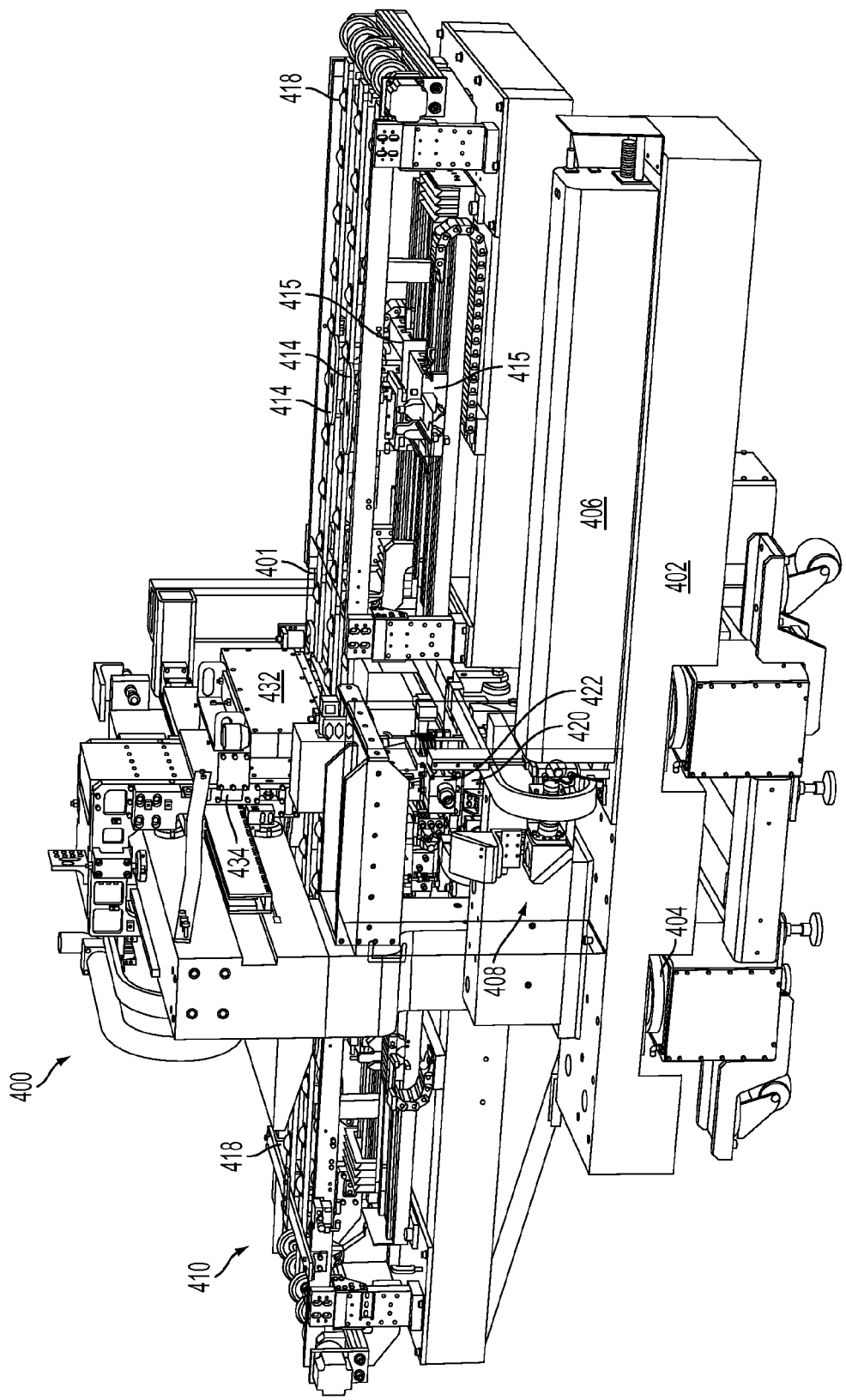

Referring to FIGS. 4A and 4B, another embodiment of a laser machining system 400 is shown and described. The laser machining system 400 may include a base 402 supported by passive vibration isolators 404. The base 402 may support and provide stability for various components of the laser machining system 400, such as a part handling system, optical heads, motion stages, and motion control systems.

In this embodiment, the part handling system 410 for supporting and moving the workpiece 401 includes vacuum grippers 414 for gripping the workpiece 401 and rollers 418 for supporting the workpiece 401. The vacuum grippers 414 are supported on motion stages 415 capable of moving the workpiece 401 along the indexing axis (i.e., the Y axis) to index the workpiece 401 through the processing section. The motion stages 415 may also move the grippers 414 along the scanning axis (i.e., the X axis), for example, to rotate the workpiece 401.

This embodiment of the laser machining system 400 includes a laser scanning stage 420 and optical head 422 located below the workpiece 401 for movement along the scanning axis. A laser source 406 mounted on the base 402 generates a laser beam, and a stationary beam delivery system 408 delivers the beam into the moving optical head 422.

This embodiment of the laser machining system 400 further includes a debris collection hood 432 mounted on the top side opposite the optical head 422. The debris collection hood 432 is fixed and extends across the width of the workpiece 401 to collect debris from the top side of the workpiece 401 as the optical head 422 scans and machines the workpiece 401 from the bottom side.

The laser machining system 400 also includes a scanning stage 434 positioned above the workpiece 401, which allows the system 400 to be retrofitted for top side machining. For example, the optical head may be mounted on the scanning stage 434 and directed downward toward the workpiece 401. In a top side machining configuration, a moving debris collection hood may be mounted on the top side for movement with the optical head such that the debris is extracted as the workpiece is machined. FIGS. 4A and 4B show the system 400 configured for bottom side machining and thus the top side scanning stage 434 is fixed.

Figure 5A:
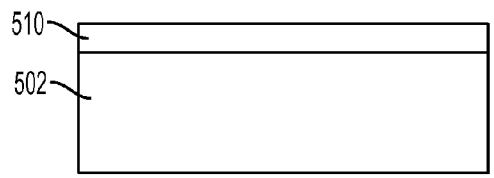
FIGS. 5A-5F are side schematic views illustrating the formation of lines in different layers of a thin film photovoltaic solar panel, consistent with an embodiment.
Figure 5B:
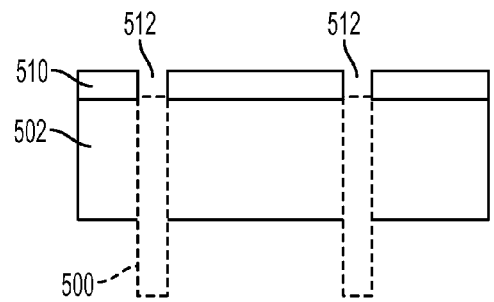

The laser machining system 100 may be used to scribe lines in large panels such as solar panels. Referring to FIGS. 5A-5F, one method of scribing lines in a thin film photovoltaic (PV) solar panel is described in greater detail. A first (P1) layer of conductive material 510 may be deposited on a substrate 502, such as glass or polyethylene terephthalate (PET) (FIG. 5A). The first layer 510 of conductive material may include a transparent conductive oxide including, but not limited to, indium tin oxide (ITO), indium zinc oxide (IZO), tin oxide (SnO) or zinc oxide (ZnO). The first layer 510 may then be scribed by directing one or more laser beams 500 through the substrate 502 to the first layer 510 to ablate a portion of the first layer 510 and form one or more scribe P1 scribe lines 512 (FIG. 5B). The scribe lines 512 may be spaced, for example, about 5-10 mm apart. The laser beam(s) 500 may have a wavelength (e.g., 1064 nm) and energy density sufficient to ablate the P1 layer 510 without damaging the substrate 502.

Figure 5C:
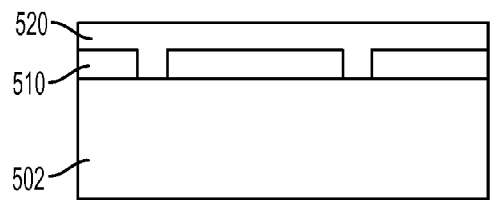
Figure 5D:
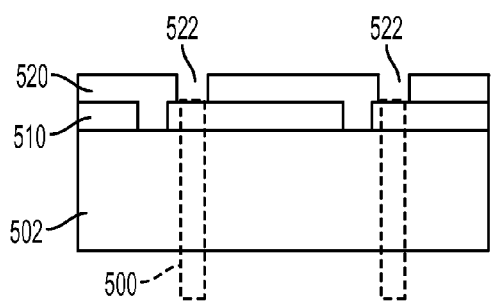

A second (P2) layer 520 of an active semiconductor material may then be deposited on the first layer 510 and within the P1 scribe lines 512 formed in the first layer 510 (FIG. 5C). The semiconductor material of the second layer 520 may include, without limitation, amorphous silicon (aSi), cadmium telluride (CdTe), copper indium gallium diselenide (CIGS), or copper indium diselenide (CIS). The second layer 520 may then be scribed by directing one or more laser beams 500 through the substrate 502 and the first layer 510 to the second layer 520 to ablate a portion of the second layer 520 and form P2 scribe lines 522 (FIG. 5D). The laser beam(s) 500 may have a wavelength (e.g., 532 nm) and energy density sufficient to ablate the P2 layer 520 without damaging the substrate 502 and the P1 layer 510.

Figure 5E:
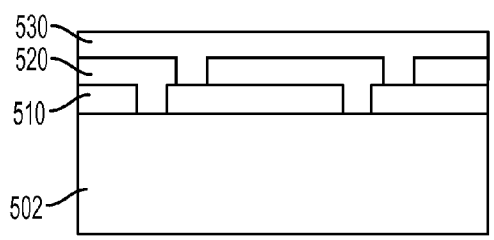
Figure 5F:
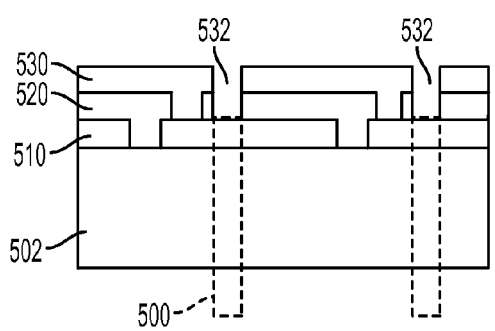

A third (P3) layer 530 of a metal may then be deposited on the second layer 520 and in the P2 scribe lines 522 formed in the second layer 520 (FIG. 5E). The conductive material of the third layer 530 may include a metal including, but not limited to, aluminum (Al), molybdenum, Mo, silver (Ag), or chromium (Cr). The second and third layers 520, 530 may then be scribed by directing one or more laser beams 500 through the substrate 502 to the second layer 520 and third layer 530 to ablate a portion of the second and third layers 520, 530 and form P3 scribe lines 532 (FIG. 5F). The laser beam(s) 500 may have a wavelength (e.g., 532 nm) and energy density sufficient to ablate the P2 and P3 layers 520, 530 without damaging the substrate 502 and the P1 layer 510.

The area with the lines 512, 522, 532 scribed in the P1-P3 layers 510, 520, 530 does not contribute toward solar energy conversion and is often referred to as a wasted or dead area. The lines 512, 522, 532 should be scribed and aligned accurately to minimize this dead area and provide the best efficiency of the solar panel. Embodiments of the laser machining system and method described herein are capable of forming the laser beams 500, directing laser beams 500 up through the substrate, and moving or scanning the beams 500 across the substrate to form the scribe lines 512, 522, 532 accurately. Embodiments of the laser machining system and method described herein may also be used to scribe the lines 512, 522, 532 from the top or film side by moving or scanning beams directed at the layers 510, 520, 530. In particular, embodiments of the vision correction and/or tracking systems described herein are capable of adjusting the beams 500 to align the scribes lines 512, 522, 532 and to provide consistent scribing width and depth.

Figure 6:
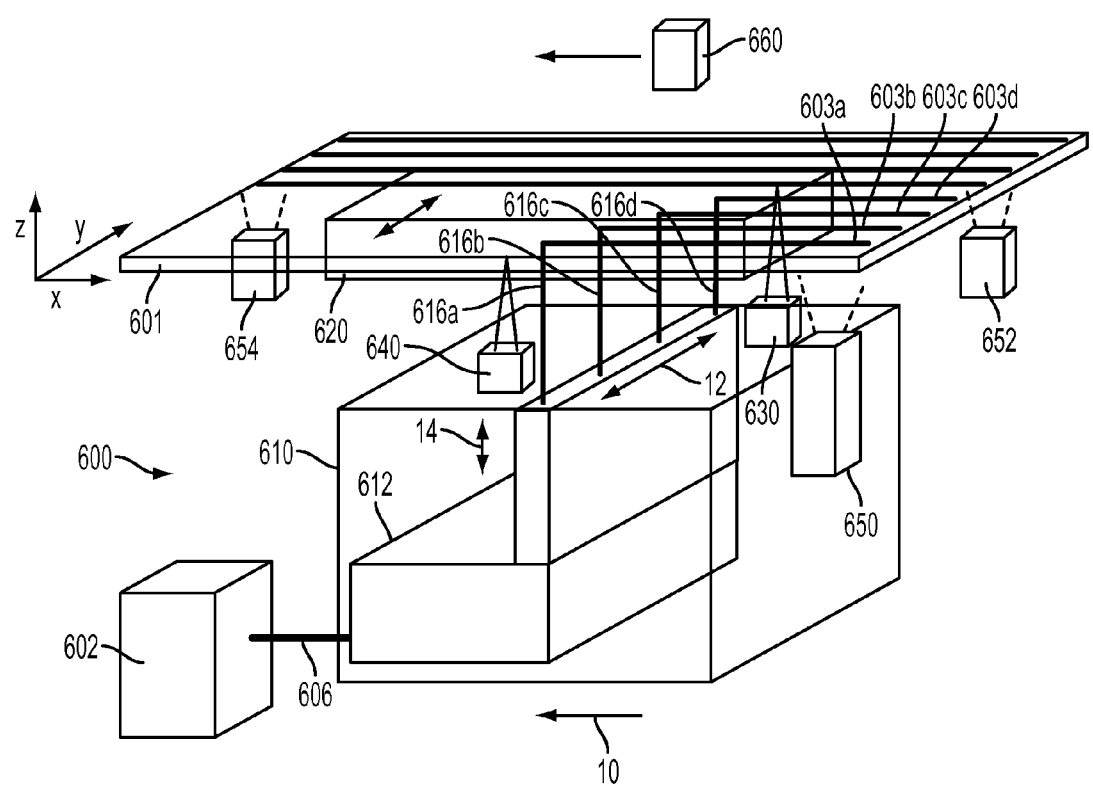
FIG. 6 is a schematic perspective view of a laser machining system including a moving optical head including a beam delivery system and sensors and cameras for use in tracking and/or vision inspection.

Referring to FIG. 6, vision correction and/or workpiece tracking may be used in a laser machining system 600 that includes a moving optical head 610 forming multiple scribe lines on a workpiece 601. The moving optical head 610 may include a beam delivery system 612 that splits a laser beam 606 from a laser source 602 into multiple beamlets 616a-616d and images the beamlets 616a-616d onto a workpiece 601. A stationary beam delivery system (not shown) may deliver the laser beam 606 from the laser source 602 to the moving optical head 600.

The optical head 610 is moved linearly (e.g., in the direction of arrow 10) such that the beamlets 616a-616d form substantially parallel scribe lines 603a-603d along the workpiece 601 as the optical head moves. The optical head 600 may be mounted, for example, on a laser scanning stage that moves in both directions along a scanning axis (e.g., the X axis), as described above. The laser beam 606 from the laser source 602 is directed into the optical head 610 substantially parallel to the linear axis of motion (i.e., the scanning axis) and the multiple beamlets 616a-616d are directed out of the optical head 600 substantially orthogonal to the scanning axis.

The moving optical head 610 may also be mounted on a manual or motorized stage for adjustment across the scanning axis (e.g., along the Y axis). As such, a scanning axis of the optical head 610 may be adjusted in either direction along the Y axis.

The beam delivery system 612 may include various components for routing the laser beam 606 and/or beamlets 616a-616d and for controlling the shape, size, uniformity, and strength of the beam 606 and/or beamlets 616a-616d. The components (not shown) of the beam delivery system 612 may include, but are not limited to, a beam splitter for splitting the beam 606 into the beamlets 616a-616d, a mask for shaping the beam 606 or beamlets 616a-616d, a homogenizer for homogenizing the beam 606 or beamlets 616a-616d, reflectors for routing and/or adjusting optical path lengths of the beamlets 616a-616d, and imaging optics for imaging the mask shape on a process plane of the workpiece 601. As used herein, the "process plane" refers to a plane on or in the workpiece where the laser is directed to machine the workpiece, for example, by causing ablation. Examples of the beam delivery systems that may be used are described in greater detail in U.S. patent application Ser. No. 12/576,504 entitled LASER MACHINING SYSTEMS AND METHODS WITH MULTIPLE BEAMLET LASER BEAM DELIVERY SYSTEM, which is filed concurrently herewith and fully incorporated herein by reference.

The laser beam may be a noncoherent beam having a top hat profile. As used herein, "noncoherent" refers to a laser beam that does not have perfect spatial or temporal coherence. Noncoherent laser beams do not produce undesirable interference effects when passing through fly eye homogenizers or other types of beam homogenizers. According to one embodiment, the laser source 602 may include a multimode laser that provides a multimode laser beam that has a $M^2$ factor greater than 1 and more particularly between 5 and 25.

According to another embodiment, the laser source 602 may include a singe mode laser ($M^2=1$) that generates a coherent Gaussian laser beam and a coherence scrambler (not shown) to provide the noncoherent beam with a top hat profile. Examples of coherence scramblers include noncoherent optical fiber scramblers, light pipes, or optical kaleidoscopes. Noncoherent beams have higher power for the same input power and may be more desirable for homogenizing, overfilling a mask and/or shaping into the desired imaging profile. The use of a noncoherent beam is facilitated by using a near field imaging technique in which image accuracy is not as dependent upon laser pointing (e.g., as compared to a far field technique in which the focal point of the beam is used and pointing shows up at the focus of the lens).

The laser source 602 may be chosen to provide selective material removal without being destructive to other layers or the substrate. As discussed above, for example, the second (P2) layer should be selectively removed without damaging the first (P1) layer. In particular, the wavelength of the laser may vary depending upon the characteristics of the material being removed. The pulse width may also vary depending upon the type and thickness of material and may generally range between about 5 ps (or less) and about 500 ns (or less) and the frequency may be in the range of about 30 kHz to 1 MHz. The use of ultra fast and subpicosecond provide a precise material removal rate and allow depth control, for example, when scribing the P2 and P3 lasers described above.

One or more of the components of the beam delivery system 612 may be capable of adjusting the beam 606 and/or beamlets 616a-616d, thereby adjusting the scribe lines 603a-603d formed on the workpiece 601. The positioning of the beamlets 616a-616d may be adjusted, for example, by moving a mask, beam splitter or other components in the direction of arrow 12 orthogonal to the scanning axis (i.e., along the Y axis). The focus of the beamlets 616a-616d may be adjusted, for example, by moving the imaging optics in the direction of arrow 14 along the beamlet axes (i.e., the Z axis). The fluence of the beamlets 616a-616d may be adjusted, for example, by adjusting the attenuation of the beam 606 or beamlets 616a-616d.

The laser machining system 600 may also include a part handling system 620 including one or more workpiece supports (e.g., vacuum chucks or grippers) and workpiece positioning stage(s) for moving the workpiece supports. The workpiece positioning stage moves the workpiece supports along an indexing axis (i.e., the Y axis) to index the workpiece, allowing another set of scribe lines to be formed. The workpiece positioning stage and workpiece supports may also be capable of moving the workpiece along the scanning axis (i.e., the X axis) or rotating the workpiece (i.e., about the Z axis and in the X-Y plane).

The laser machining system 600 may further include one or more monitoring devices for monitoring parameters or characteristics of the workpiece 601, the scribe lines 603a-603d, and/or the beamlets 616a-616d. Data from these monitoring devices may be used to adjust processing parameters and/or may be logged as the data is collected. The monitoring devices may include one or more sensors 630, 640 mounted for movement with the moving optical head 610 to sense a workpiece position, a scribe line position, or other conditions as the optical head 610 is scanning. A scribe position sensor 630 may be used to sense a position of a scribe line on the workpiece 601 to provide scribe line tracking, as described in greater detail below. A height sensor 640 may be used to sense a process plane or surfaces of the workpiece 601 for determining a relative height of the workpiece or a thickness of the workpiece 601. The sensors 630, 640 may be mounted to the optical head 610 or to a scanning stage that moves the optical head 610.

The monitoring devices may also include one or more cameras 650, 652, 654 for viewing the workpiece 601, the processing area, and/or the scribe lines 603a-603d. At least one scanning camera 650 may be mounted for movement with the optical head 610 for viewing the processing area and/or scribe lines as the optical head 610 is scanning. The scanning camera 650 may be mounted to the optical head 610 or to a scanning stage that moves the optical head 610. One or more alignment cameras 652, 654 may be positioned for viewing ends of the scribe lines to determine a width, position, and/or angle of rotation of the scribe lines. The alignment cameras 652, 654 may be mounted stationary at each side of the laser machining system 600 to view the respective ends of one or more of the scribe lines. Although the alignment cameras 652, 654 are shown beneath the workpiece 601, the alignment cameras 652, 654 may also be located above the workpiece 601.

One or more monitoring devices 660 may also be mounted for movement with the optical head 610 on an opposite side of the workpiece 601. The monitoring device(s) 660 may include, for example, a camera for viewing the processing area and/or scribe lines as they are formed on the workpiece 601, a sensor for sensing a scribe line or workpiece surface or process plane, a spectroscopic sensor for sensing optical emission spectra created by the scribe, and/or a beamlet power meter for monitoring power of the beamlets. Monitoring devices may also be provided in other locations within the laser machining system.

A laser machining system, consistent with embodiments described herein, may further include one or more tracking systems that track workpiece and/or scribing conditions and adjust scribing parameters in response thereto. When scribing lines on large panels, such as solar panels, the process parameters, positional offsets, and other elements, may be varied to provide uniform, aligned scribe lines. Uniform scribe lines may have substantially uniform depth, width, heat-affected-zones (HAZ) and penetration into non-scribed layers. To provide uniformity in the scribe lines, the scribing may need to be adjusted to compensate for certain non-uniformities in the workpiece such as the lack of surface flatness, glass thickness and/or coating non-uniformities. Without compensation, variations in the distance from a workpiece to a focusing or imaging lens, for example, may cause undesirable scribe variations (e.g., in width and/or fluence).

Figure 7:
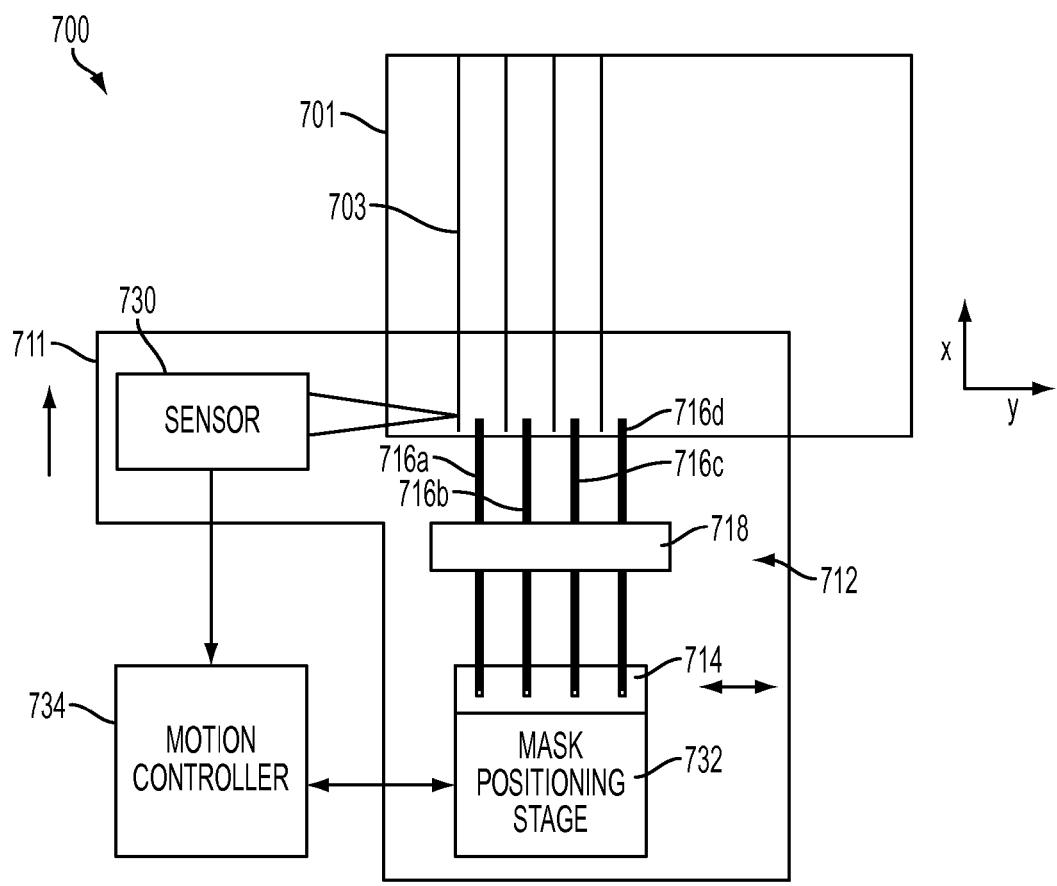
FIG. 7 is a diagrammatic view of a line tracking system for use in a laser machining system, consistent with an embodiment.

Referring to FIG. 7, an embodiment of a line tracking system 700 for a laser machining system is described in greater detail. The line tracking system 700 may be used with laser machining systems and optical heads such as those described above. According to one embodiment, the line tracking system 700 may align scribe lines by sensing a position of a previously scribed line 703 on a workpiece 701 and adjusting the scribing of a current scribe line on the workpiece 701 in response to sensed changes in the position of the previous scribe line 703. The position of the current scribe line may be adjusted in real time to track the position of the previous scribe line such that the current line has a substantially constant relative separation from the previous line 703. In a thin film PV solar panel, for example, a P2 scribe line may be aligned with a P1 scribe line and a P3 scribe line may be aligned with a P2 or P1 scribe line. The alignment may be relative to the leading edge, center, or trailing edge of the previous scribe line.

The line tracking system 700 may include a position sensor 730 to sense the position of the previous scribe line 703 in a direction substantially perpendicular to the scribe line (e.g., a position along the Y axis). The position sensor 730 may include a reflective sensor with an emitter and receiver mounted on a scanning stage 711 or on an optical head on the scanning stage 711. Alternatively, the position sensor 730 may use a through beam arrangement with a receiver mounted on the scanning stage 711 and an emitter on the opposite side of the workpiece 701, or vice versa.

The position of the current scribe line may be adjusted by moving the beamlet optically and/or by positioning the workpiece 701 in a direction substantially perpendicular to the scribe line. One embodiment of the beam delivery system 712 may include a mask 714 to shape multiple beamlets 716a-716d and imaging optics 718, such as a lens array, to image the beamlets on a process plane of the workpiece 701 using a near field imaging technique. The mask 714 includes apertures for receiving each of the beamlets 716a-716d, which back illuminate and overfill the mask 714. To move the scribe optically, a mask positioning stage 732 may be used to move the mask 714 in the direction substantially perpendicular to the scribe line(s), thereby adjusting the position of the beamlets 716a-716d along the indexing axis (i.e., the Y axis) on the workpiece 701. A lateral shift adjustment of the scribe lines 703 may be performed more accurately by moving the mask 714 due to the demagnification ratio of the imaged beamlets (i.e., a shift of the mask 714 results in a proportionately smaller shift of the image on the workpiece 701), thereby increasing scribe line alignment accuracy.

The beamlets may also be moved optically using other techniques, for example, by moving other components in the beam delivery system that will result in shifting the position of the beamlets or by using fast turning mirrors. For example, the image optics 718 (e.g., a focus lens array) may be moved laterally to provide a lateral shift of the scribe lines. The stages used to move the mask or other components may be PZT stages or voice coil positioning stages. The entire beam delivery system 712 may also be moved along the indexing axis, for example, by positioning the optical head on a Y axis stage.

The line tracking system 700 also includes a motion controller 734 for controlling the movement and positioning of the mask positioning stage 732. The motion controller 734 receives the scribe position information from the position sensor 730 and determines if the previous scribe position has changed (e.g., in the Y axis) by a certain amount. If the position has changed, the motion controller 734 causes the positioning stage 732 to move by a corresponding amount such that the relative separation between the lines is substantially constant. The motion controller 734 may receive position feedback information (e.g., from an encoder) representing a position of the mask positioning stage 732 and uses the position feedback to control positioning of the stage 732. Moving the scribe line optically may also require a corresponding change in focus, for example, by adjusting the lens array or imaging optics 718 as described below.

The motion controller 734 may further be used to control movement of other optical components or the workpiece 701 to change the position of the current scribe in response to changes in position of a previous scribe in a similar manner. For example, other optical components capable of shifting the beamlets laterally may be coupled to a positioning stage that is controlled by the motion controller 734. One or more positioning stages for positioning the workpiece 701 may also be controlled by the motion controller 734. The line tracking system 700 may also be incorporated with a height tracking system or workpiece thickness tracking system, as described below.

Figure 8:
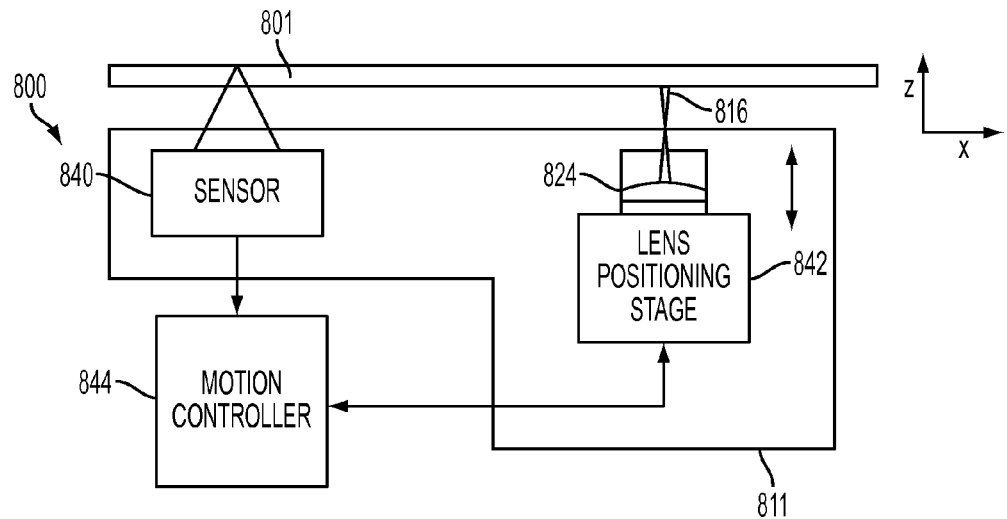
FIG. 8 is diagrammatic view of a workpiece tracking system for use in a laser machining system, consistent with an embodiment.
Figure 9:
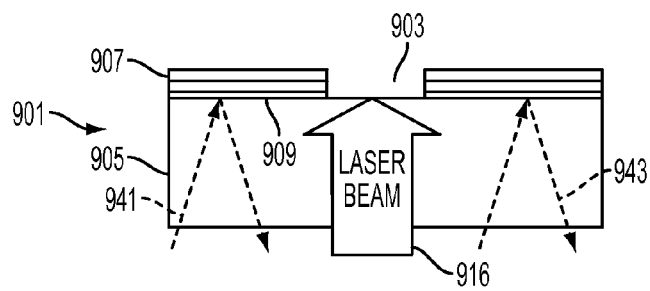
FIG. 9 is a schematic cross-sectional view of a workpiece with sensor beams reflecting from a process plane of the workpiece.
Figure 10:
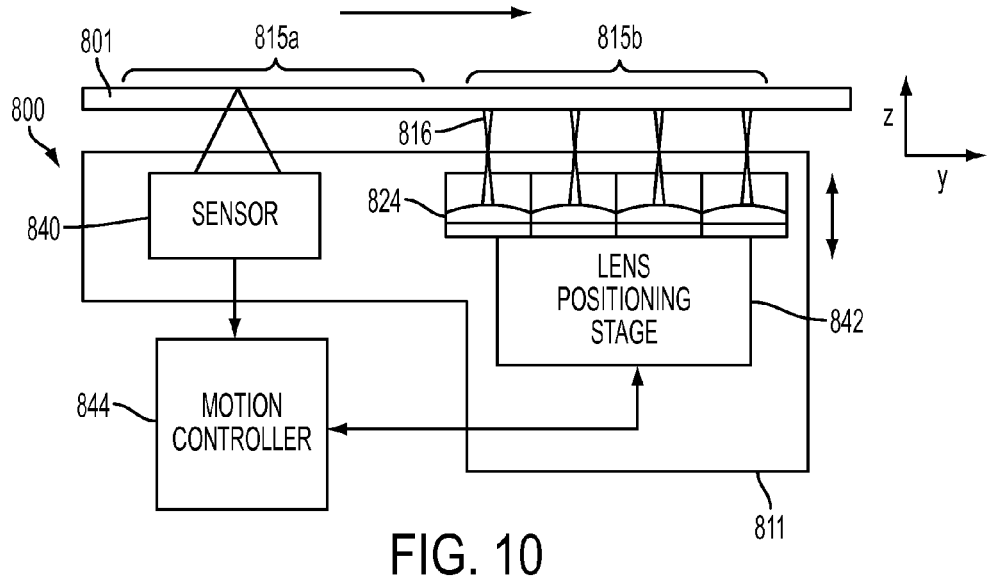
FIG. 10 is diagrammatic view of a workpiece tracking system for use in a laser machining system, consistent with another embodiment.

Referring to FIGS. 8-10, an embodiment of a workpiece tracking system 800 for a laser machining system is described in greater detail. The workpiece tracking system 800 may be used with laser machining systems and optical heads such as those described above. In general, the workpiece tracking system 800 measures an aspect of the workpiece and adjusts a scribing parameter in response to changes in the workpiece. The workpiece tracking system 800 may measure, for example, the relative height of a workpiece 801 and adjust a focus of the beamlet(s) in response to changes in the relative height. The workpiece tracking system 800 may also measure a thickness of the workpiece 801 and adjust a focus and/or fluence of the beamlet(s) in response to changes in the workpiece thickness.

The workpiece tracking system 801 may include one or more sensors 840 or other devices for measuring the relative height and/or thickness of the workpiece 801. The sensor(s) 840 may be mounted on the scanning stage 811 or on an optical head on the scanning stage 811 to measure relative height and/or thickness. In an embodiment, the sensor 840 may be located within the processing section at a point ahead of the scribing process. Although one sensor 840 is shown on one side of the beamlets 816, sensors may be located on both sides of the beamlets 816 such that the height and/or thickness of the workpiece may be measured ahead of the scribing process when the scanning stage is moved in either direction along the scanning axis (i.e., the X axis).

The sensor 840 may be a laser sensor, such as a laser interferometer or laser triangulation sensor, capable of sensing one or more surfaces of the workpiece 801 and/or a process plane of the workpiece 801. As shown in FIG. 9, the relative height may be determined by sensing and measuring the relative height of a process plane within a workpiece. In this example, the workpiece 901 includes a substrate 905, such as a glass panel, and one or more coatings 907, such as the P1-P3 layers, on the substrate 905. In this example, the process plane of the workpiece 901 is the interface 909 between the substrate 905 and one of the coatings 907 on the substrate 905. The laser beam 916 is imaged onto the interface 909 to remove a portion of the one or more coatings 907, thereby forming a scribe line 903. Sensor beams 941, 943 emitted by one or more sensors (not shown in FIG. 9) are reflected from the interface 909 to sense changes in a relative height of the interface 909. The sensors 840 may also be capable of sensing the surfaces and/or process plane of a workpiece from a top side.

The relative height may also be determined by sensing and measuring the relative height of the top or bottom surfaces of the workpiece using the sensor 840. The relative height of the bottom surface of the workpiece 801 may also be measured using other non-contact measurement devices such as a sliding vacuum/air-bearing puck with a LVDT displacement sensor or using contacting measurement device that contact the bottom surface. The contacting measurement devices may include a mechanical follower that contacts the near or bottom surface of the workpiece 801 and a displacement measurement device such as a potentiometer, linear variable differential transformer (LVDT), or rotary variable differential transformer (RVDT).

The thickness of the workpiece may be measured by using the sensor 840 to sense the vertical position of both surfaces of the workpiece 801. The sensor 840 may be a laser interferometer or a laser triangulation sensor used to track the far or top surface and the near or bottom surface of the workpiece 801 and thus measure thickness between the surfaces. A coating or optical filter may be used to differentiate between the top and bottom surfaces of the workpiece 801. The sensor 840 may also be a reflective sensor with an emitter and a linear array receiver mounted on the moving scanning stage 811. The reflection from each of the surfaces records a relative maximum on the receiver array with the height of each surface being inferred from the locations of the maxima. The thickness may then be determined as the difference in the heights of each surface. In some embodiments, the same sensor 840 may be used to measure both the relative height and the thickness of the workpiece 801. The range of measurement may depend on the specification of the workpiece and the resolution and accuracy may depend on the processing requirements, but ranges of ±2.5 mm with sub 1.0 µm resolution may be typical.

According to an embodiment of the workpiece tracking system 800, the height and/or thickness information may be used to change the focus of one or more beamlets 816 imaged on a process plane of the workpiece 801. The beamlet(s) 816 are imaged onto the process plane using imaging optics including a focusing or imaging lens 824 (or lens array for multiple beamlets). To change the focus, a lens positioning stage 842 may be used to move the lens 824 relative to the workpiece 801 and along the axes of the beamlets (e.g., along the Z axis). The lens position stage 842 may include a leadscrew or ballscrew positioning stage, a voice coil positioning stage, or a piezoelectric motorized stage. Changing the focus of the beamlet(s) 816 changes the width and fluence of the beamlet(s) 816 imaged onto the process plane of the workpiece 801. The focus may also be changed by moving a mask and fixed lens together, which may provide a more sensitive movement due to the demagnification factor.

The workpiece tracking system 800 also includes a motion controller 844 for controlling the movement and positioning of the lens positioning stage 842. The motion controller 844 receives the position information from the sensor 840 or other such device and determines if the height and/or thickness has changed by a certain amount. If the height and/or thickness have changed, the motion controller 844 causes the positioning stage 842 to move to change the focus by a corresponding amount. As the relative height increases, for example, the motion controller 844 may cause a corresponding change in the position of the lens 824 toward the workpiece 801 to maintain a consistent focus, thereby compensating for lack of flatness of the workpiece. The corresponding change in position of the lens 824 is not necessarily directly proportional to the variation in height and/or thickness but may follow some function of height and/or thickness variation, which may be determined by testing scribes. The motion controller 844 may also receive stage position feedback information and use that position feedback to control positioning of the stage 842. The workpiece tracking system 800 may thus change the focus in real time to image the beamlet(s) consistently on the workpiece as the scanning stage 811 moves along the scanning axis. Other components within the beam delivery system may also be moved similarly instead of or together with the focusing lens 824 to track the height and/or thickness of the workpiece 801.

Although a real time workpiece tracking system is described above, the lens 824 or other components may also be positioned based on measurements taken along the scanning axis in a region of the workpiece that has not yet been processed. In one such embodiment, a plurality of stationary sensors may be located at multiple locations along the scanning axis to record the height and/or thickness information at each location along a region of the workpiece before that region is located in the processing area (i.e., opposite the optical head). The height and/or thickness information measured at each location along that region may be used to calculate a motion profile slope (e.g., using linear or higher order interpolation) to be followed by the motion controller 844 when that measured region is subsequently indexed into the processing area.

In another embodiment, the sensor 840 on the stage 811 or optical head may be offset from the lens 824 such that the sensor 840 moves parallel to the process and along a region of the workpiece 801 that has not yet been processed. The sensor 840 records the exact curvature of the workpiece 801 along this region and this pre-recorded motion profile may be used by the motion controller 844 when that measured region reaches the processing area. As shown in FIG. 10, for example, the sensor 840 may record a motion profile along the scribing axis (i.e., the X axis) in a region 815*a* while lenses 824 direct beamlets 816 at the workpiece 801 to scribe lines along a region 815*b*. When the workpiece 801 is indexed (i.e., along the Y axis) such that the region 815*a* is positioned in the processing area for scribing, the motion controller 844 may use the motion profile measured for that region 815*a* to move the positioning stage 842.

Other embodiments of a workpiece tracking system may also vary other processing parameters to track changes in workpiece conditions such as height and/or thickness. Varying scan fluence as a function of thickness, for example, may conserve energy and limit undesirable increases in heat affected zone (HAZ) and/or undesirable penetration into adjacent layers of coatings. Scan fluence may be varied, for example, using programmable attenuators or by varying laser energy. By changing laser parameters in response to workpiece conditions such as thickness, a laser machining system may conserve laser power consumption. Other optical elements or components may also be moved to adjust other processing parameters. For example, beam shaping optics may be moved to change the size and/or shape of a beam, thereby adjusting energy density or fluence of the beam.

According to another embodiment, a tracking system may use real time material spectroscopy. This type of tracking system captures optical emission spectra created by the scribe and uses the spectra to adjust process parameters in real time. The optical emission spectra may be captured using a spectroscopic sensor on the opposite surface from the scan. The material that are scribed (e.g., the P1-P3 layers in a solar panel) have characteristic optical emission spectra. The emission spectra of the plume generated by laser machining the layers will indicate which materials are being removed and the intensity will indicate how much is being removed. The background continuum may also be used to estimate plume temperature and pressure based on Wien's Law, which states that objects of different temperature emit spectra that peak at different wavelengths. Process parameters, such as fluence and focus of the beamlets, may be adjusted in real time based on the emission spectra data.

Thus, workpiece tracking systems allow scribe variations, such as width and fluence, to be minimized when scribing large, non-planar workpieces or large, non-uniform coated workpieces.

Figure 11:
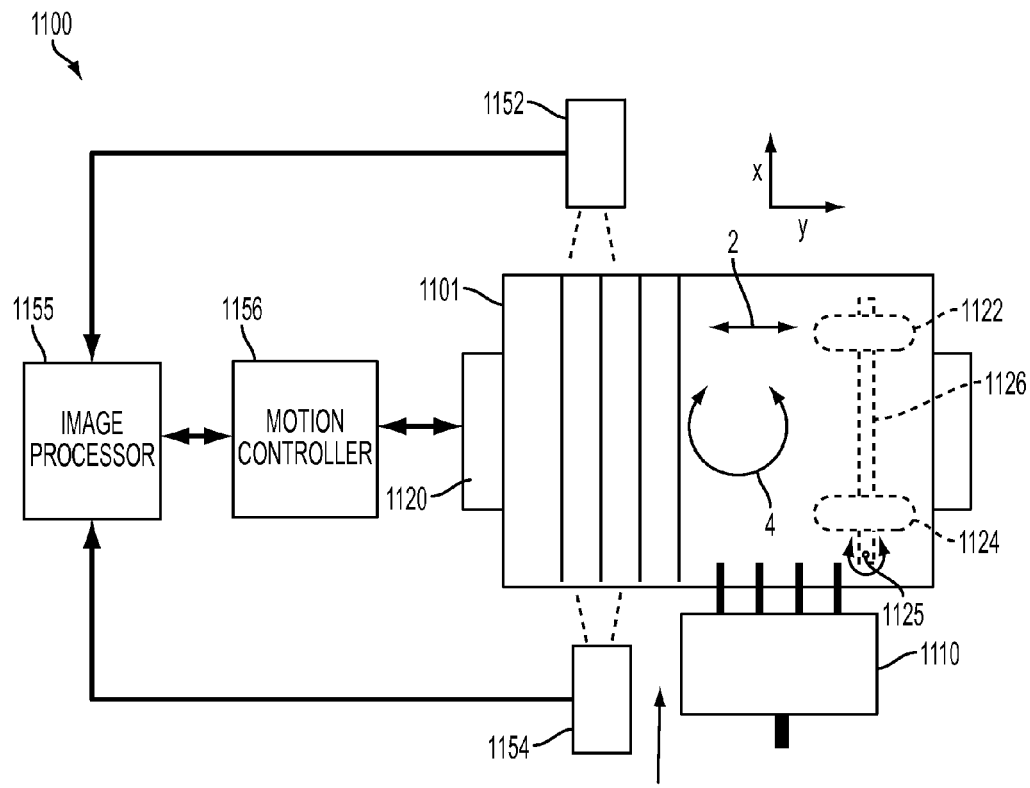
FIG. 11 is a diagrammatic view of a workpiece alignment system that uses vision inspection, consistent with an embodiment.

Referring to FIG. 11, embodiments of a vision correction system 1100 are described in greater detail. The vision correction system 1100 may be used with laser machining systems and optical heads such as those described above. According to one embodiment, the vision correction system 1100 may align scribe lines by determining a position and/or orientation of a previously scribed line 1103 and adjusting a position and/or orientation of a new scribe line based on the position and/or orientation information for the previous scribe line.

The vision correction system 1100 may include one or more alignment cameras 1152, 1154 to view the scribe lines 1103 on the workpiece 1101. The alignment cameras 1152, 1154 may be digital progressive scan cameras. The alignment cameras 1152, 1154 may be stationary and mounted at opposite sides of the laser machining system at substantially the same position in the Y axis such that the cameras 1152, 1154 view at least one of the scribe lines 1103 proximate respective ends of the scribe line. By viewing end portions of a scribe line, the rotation angle $\Theta$ of the scribe line, the width of the scribe line, and the position of the scribe line in the Y axis may be determined. These values may be stored in a data log, for example, in real time during operation of the laser scribing system.

The position and/or orientation of a new scribe line may be adjusted by adjusting a position and/or orientation of the workpiece 1101 before scribing with an optical head 1110. A part handling system 1120 may include one or more workpiece supports 1122, 1124, such as vacuum grippers or chucks, and one or more positioning stages capable of moving the workpiece supports 1122, 1124 in the X or Y axes. The part handling system 1120 moves the workpiece in the direction of the Y axis to index the workpiece for sequential scribing operations and to adjust the position at which the scribe lines are formed on the workpiece 1101 in the Y axis. The part handling system 1120 may further rotate the workpiece 1101 within the X-Y plane to adjust the orientation of the workpiece 1101 and thus the scribe lines formed on the workpiece 1101.

The vision correction system 1100 may also include an image processor 1155 for processing an image obtained by the cameras 1152, 1154 and a motion controller 1156 for controlling movement of the part handling system 1120 by causing movement of one or more of the stages coupled to the workpiece supports 1122, 1124. The image processor 1155 may process an image of the scribe line, for example, to determine a rotation angle and/or position in the Y axis. The motion controller 1156 may receive the rotation angle and/or position information for the previous scribe line, and use this information to determine if the position of the workpiece 1101 should be adjusted in the Y axis or if the rotation of the workpiece 1101 should be adjusted such that a subsequent new scribe line is aligned with the previous scribe line.

In one embodiment, the workpiece supports 1122, 1124 may each be supported on X-Y axis stages moveable in the X and Y axes to adjust both the rotational angle $\Theta$ and the position in the Y axis. In another embodiment, the workpiece supports 1122, 1124 may be coupled to a pivoting support 1126 that is pivotable about a pivot point 1125 to adjust the rotational angle $\Theta$ of the workpiece 1101. The pivoting support 1126 may be pivoted by a motor controlled by the motion controller 1156. The workpiece supports 1122, 1124 and pivoting support 1126 may be supported on a Y axis stage to provide the Y axis indexing and positioning.

Figure 12:
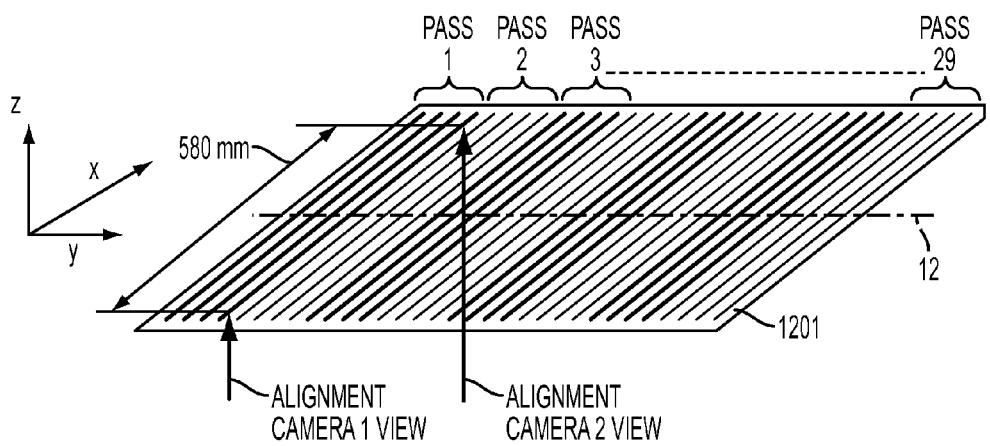
FIG. 12 is a perspective view of a panel including multiple sets of scribe lines formed thereon, consistent with embodiments of the laser machining system and method.

As shown in FIG. 12, multiple sets of scribe lines may be formed in or on a workpiece 1201 with sequential passes of an optical head. In one exemplary embodiment, the alignment cameras may be used to view a scribe from each pass as the next set of scribes is being formed. Thus, the alignment cameras view a scribe (e.g., the 4$^{th}$ scribe) from Pass 1 as the optical head moves to form the scribes on Pass 2 and corrections may be made before Pass 3 based on the determined position and/or orientation of the scribe from Pass 1.

The workpiece 1201 may be indexed such that a subsequent set of scribe lines is formed adjacent a previous set of scribe lines (e.g, each Pass shown in FIG. 12 is formed adjacent a previous Pass). A subsequent set of scribe lines may also be formed to overlay a previous set of scribe lines, for example, by indexing the workpiece 1201 or by adjusting the scanning axis of the optical head in along the indexing axis (i.e., along the Y axis).

A shown, the scribe lines may also be inset from the edge of the workpiece 1201 at each end of the scribe line, for example, by starting and stopping the laser when the optical head is at the desired position at the beginning and end, respectively, of a scan. The laser may be turned on when the optical head is at the desired start position (e.g., providing the desired inset) and then left on for a predetermined time to produce a fixed scribe length. When processing solar panels, for example, providing this inset mitigates electrostatic issues. Thus, the scribe line location along the scanning axis may be corrected by turning the laser on and off and without having to adjust the workpiece 1201 in the direction of the scanning axis.

The length of the workpiece 1201 may also be measured "on the fly" (i.e., as the workpiece 1201 is indexed), for example, using vision inspection cameras or sensors. The measured length of the workpiece 1201 may be used to center the scribe lines on the workpiece 1201. By measuring the length, for example, a center line 12 of the workpiece 1201 may be located and the optical head may be moved to a desired start position relative to the center line 12.

Figure 13:
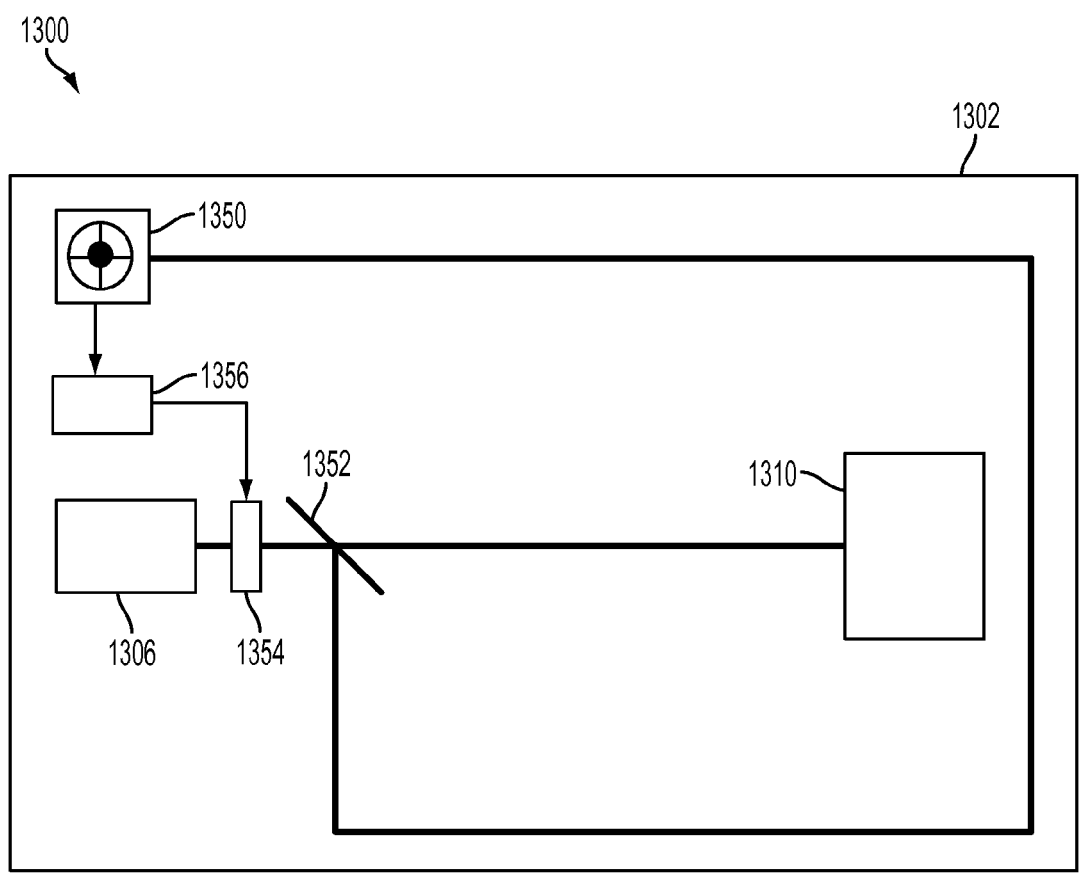
FIG. 13 is a schematic view of a long working distance beam detection system, consistent with an embodiment.

Referring to FIG. 13, a laser machining system 1300 may also include a beam position tracking system for tracking a position of a laser beam and adjusting the laser beam to assure beam pointing stability at a long working distance. The laser machining system 1300 may include a base 1302, a laser source 1306 for generating the laser beam, and an optical head 1310 into which the beam is directed, for example, as described in one of the embodiments above.

In one embodiment, the beam position tracking system may include a quad detector or other position detector 1350 that is located at a long working distance from the laser 1306 to compensate for laser beam stability issues in a long working distance system. The quad detector or other position detector 1350 may be located at a long working distance that is at least as long as the scan distance and may be twice the scan distance or longer. For example, the laser beam emitted from the laser 1306 may be split by a beamsplitter 1352 and wrapped around a perimeter of the base 1302 of the laser machining system 1300 to provide the long working distance detection.

The quad detector or other position detector 1350 may also be located inside of the moving optical head 1310 to account for motion stage travel errors and compensate for slide straightness in addition to laser beam pointing issues. In other embodiments, the beam may also travel through the optical head 1310 to the detector 1350. The beam position tracking system may also include fast steering mirrors 1354 for changing the direction of the beam emitted from the laser source 1306 and a feedback circuit 1356 for receiving information from the position detector 1350 and causing the fast steering mirrors 1354 to change the direction of the beam to maintain a desired beam position, for example, using techniques known to those skilled in the art. The fast steering mirrors 1354 may also change a direction of the beam in response to feedback from scribe sensors (e.g., sensor 730 in FIG. 7) to provide scribe line tracking.

Accordingly, tracking and vision correction may be used during laser machining to assure alignment of scribe lines and uniformity in the scribe lines. Such alignment and uniformity is particularly important when scribing solar panels. One example of a laser machining system, consistent with embodiments described herein, is capable of a position accuracy of +/−2.5 µm.

Consistent with one embodiment, a laser machining system includes a part handling system including a workpiece support surface for supporting a workpiece to be machined and at least one laser source for generating at least one laser beam. At least one laser scanning stage is positioned relative to the part handling system for linear movement along a scanning axis, and a movable optical head is located on the laser scanning stage. The optical head includes a beam delivery system for receiving the at least one laser beam, for modifying the at least one laser beam, and for directing the modified beam at the workpiece while moving to machine the workpiece. The laser machining system further includes a workpiece tracking system for tracking changes in the workpiece relative to the moving optical head and for adjusting at least one parameter of the modified beam in response to the changes in the workpiece.

Consistent with another embodiment, a laser machining system includes a part handling system including a workpiece support surface for supporting a workpiece to be machined and at least one laser source for generating at least one laser beam. At least one laser scanning stage is positioned relative to the part handling system for linear movement along a scanning axis, and an optical head is located on the laser scanning stage. The optical head includes a beam delivery system for receiving the at least one laser beam, modifying the laser beam, and directing the modified beam at the workpiece while moving to form a scribe line on the workpiece. The laser machining system further includes a scribe line tracking system for tracking a position of a scribe line on the workpiece and for adjusting a position of a current scribe line being formed on the workpiece in response to changes in a position of the scribe line.

Consistent with a further embodiment, a laser machining system includes a part handling system including a workpiece support surface for supporting a workpiece to be machined and at least one laser source for generating at least one laser beam. At least one laser scanning stage is positioned relative to the part handling system for linear movement along a scanning axis, and an optical head is located on the laser scanning stage. The optical head includes a beam delivery system for receiving the at least one laser beam, modifying the laser beam, and directing the modified beam at the workpiece while moving to form a scribe line on the workpiece. The laser machining system further includes a vision correction system for viewing at least one scribe line on the workpiece and for positioning a workpiece in response to at least one parameter of the scribe line on the workpiece.

Consistent with yet another embodiment, a method is provided for laser machining a panel using a movable optical head that moves along a scanning axis. The method includes: mounting the panel on a part handling system; generating at least one laser beam; directing the laser beam substantially parallel to the scanning axis and into at least one optical head such that the optical head modifies the beam and directs at least one modified beam out of the optical head substantially orthogonal to the scanning axis; moving the optical head along the scanning axis and across the panel such that the at least one modified beam scans the panel and forms a scribe line in the panel; and adjusting at least one parameter in response to a detected change in the workpiece or a scribe line on the workpiece.

Consistent with yet another embodiment, a method is provided for machining a panel. The method includes: mounting the panel on a part handling system and forming a plurality of sets of scribe lines along the panel. Forming each of the sets of scribe lines includes: indexing the panel along an indexing axis; and moving an optical head along a scanning axes orthogonal to the indexing axis while directing a plurality of beamlets at the panel to form a set of scribe lines along the panel; and adjusting at least one scribing parameter in response to a detected parameter of the workpiece or a scribe line on the workpiece.

Consistent with yet a further embodiment, laser machining system includes a part handling system including a workpiece support surface for supporting a workpiece to be machined and at least one laser source for generating at least one laser beam. At least one laser scanning stage is positioned relative to the part handling system for linear movement along a scanning axis, and an optical head is located on the laser scanning stage. The optical head includes a beam delivery system for receiving the beam and modifying the beam while moving. The laser machining system further includes a beam position tracking system comprising a position detector for receiving a portion of the at least one laser beam, wherein the position detector is located such that a beam path from the laser source to the position detector is at least as long as a working distance of the laser beam from the laser source to the workpiece.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser machining system comprising:
 a part handling system including a workpiece support surface for supporting a workpiece to be machined;
 at least one stationary laser source for generating at least one laser beam;
 at least one laser scanning stage positioned relative to the part handling system for linear movement along a scanning axis;
 a movable optical head located on the laser scanning stage and movable relative to the stationary laser source, the optical head including a beam delivery system for receiving the at least one laser beam, for modifying the at least one laser beam, and for directing the modified beam at the workpiece while moving to machine the workpiece, wherein the beam delivery system comprises at least one mask and at least one lens for near field imaging the modified beam onto the workpiece, and wherein the beam delivery system further includes a lens translation stage for moving the lens and adjusting the focus of the modified beam; and
 a workpiece tracking system for tracking changes in the workpiece relative to the moving optical head and for adjusting at least one parameter of the modified beam in response to the changes in the workpiece, wherein the workpiece tracking system measures changes in a height of a process plane of the workpiece relative to the optical head, and wherein the lens translation stage moves the lens and adjusts the focus of the modified beam in response to changes in the height of the process plane of the workpiece supported on the workpiece support surface.

2. The laser machining system of claim 1, wherein the part handling system, the scanning stage and the optical head are arranged such that the optical head is located below the workpiece support surface.

3. The laser machining system of claim 1 wherein the workpiece tracking system comprises at least one sensor for sensing a process plane or a surface of the workpiece to track changes in a relative height of the workpiece relative to the optical head.

4. The laser machining system of claim 1 wherein the workpiece tracking system comprises at least one sensor for sensing top and bottom surfaces of the workpiece to track changes in thickness of the workpiece.

5. The laser machining system of claim 1 wherein the workpiece tracking system measures changes in a thickness of the workpiece and adjusts laser beam fluence in response to changes in thickness of the workpiece.

6. The laser machining system of claim 1 wherein the beam delivery system is configured to modify the laser beam by forming multiple beamlets and delivering the multiple beamlets to the workpiece.

7. A laser machining system comprising:
 a part handling system including a workpiece support surface for supporting a workpiece to be machined;
 at least one stationary laser source for generating at least one laser beam;
 at least one laser scanning stage positioned relative to the part handling system for linear movement along a scanning axis;
 an optical head located on the laser scanning stage and movable relative to the stationary laser source, the optical head including a beam delivery system for receiving the at least one laser beam, modifying the laser beam, and directing the modified beam at the workpiece while moving to form a scribe line on the workpiece, wherein the beam delivery system comprises a mask and at least one lens for near field imaging the beam on a workpiece supported on the workpiece support surface, and wherein the beam delivery system further includes a mask translation stage for moving the mask and changing a position of the beam on the workpiece; and
 a scribe line tracking system for tracking a position of a scribe line on the workpiece and for adjusting a position of a current scribe line being formed on the workpiece in response to changes in a position of the scribe line, wherein the mask translation stage moves the mask and changes the position of the scribe line in response to changes in the position of the previous scribe line on the workpiece.

8. The laser machining system of claim 7, wherein the part handling system, the scanning stage and the optical head are arranged such that the optical head is located below the workpiece support surface.

9. The laser machining system of claim 7 further comprising a sensor for sensing the position of the previous scribe line on the workpiece.

10. The laser machining system of claim 7 further comprising a camera mounted for movement with the laser scanning stage and configured to view the scribe line as the laser scanning stage moves along the scanning axis.

11. The laser machining system of claim 7 wherein the beam delivery system is configured to modify the laser beam by forming multiple beamlets and delivering the multiple beamlets to the workpiece.

12. A method of laser machining a panel using a movable optical head that moves along a scanning axis, the method comprising:

mounting the panel on a part handling system;

generating at least one laser beam from a stationary laser source;

directing the laser beam substantially parallel to the scanning axis and into at least one optical head such that the optical head modifies the beam and directs at least one modified beam out of the optical head substantially orthogonal to the scanning axis, wherein the optical head includes at least one mask and at least one lens for near field imaging the modified beam onto the panel;

moving the optical head, without moving the stationary laser source, along the scanning axis and across the panel such that the at least one modified beam scans the panel and forms a scribe line in the panel;

tracking changes in a relative height of a process plane of the panel; and changing a focus of the modified beam directed out of the optical head in response to changes in the relative height of the process plane of the panel.

13. The method of claim 12 wherein the panel is a thin film solar panel, and wherein the scribe line is formed in at least one thin film layer of the thin film solar panel.

14. The method of claim 12 further comprising:

tracking a position of a previous scribe line on the panel; and changing a position of the at least one modified beam on the panel in response to changes in position of the previous scribe line.

15. The method of claim 12 further comprising:

tracking changes in a thickness of the panel; and changing a fluence of the beam in response to changes in the thickness of the panel.

16. The method of claim 12 wherein the optical head splits the laser beam and directs multiple beamlets out of the top region of the optical head to form multiple scribe lines simultaneously.

17. The method of claim 12 further comprising viewing, while moving the optical head to form the scribe line, at least one previous scribe line that was formed in the panel and determining at least one parameter of the previous scribe line.

18. The method of claim 17 wherein the at least one scribe line parameter includes at least one of a rotation angle of the previous scribe, a width of the previous scribe, and a position of the previous scribe.

19. The method of claim 17 wherein adjusting at least one parameter includes adjusting a position of the panel in response to the at least one scribe line parameter.

20. The method of claim 17 further comprising logging parameter data representing the at least one parameter.

21. The method of claim 12 wherein the optical head further includes a lens translation stage for moving the lens and adjusting the focus of the modified beam imaged onto the panel, and wherein changing a focus of the modified beam directed out of the optical head in response to changes in the relative height of the process plane of the panel includes moving the lens relative to the panel.

22. The method of claim 14 wherein the optical head further includes a mask translation stage for moving the mask to change a position of the modified beam imaged onto the panel, and wherein changing the position of the at least one modified beam on the panel in response to changes in position of the previous scribe line includes moving the mask.

23. A method of laser machining a panel using a movable optical head that moves along a scanning axis, the method comprising:

mounting the panel on a part handling system;

generating at least one laser beam from a stationary laser source;

directing the laser beam substantially parallel to the scanning axis and into at least one optical head such that the optical head modifies the beam and directs at least one modified beam out of the optical head substantially orthogonal to the scanning axis, wherein the optical head includes at least one mask and at least one lens for near field imaging the modified beam onto the panel;

moving the optical head, without moving the stationary laser source, along the scanning axis and across the panel such that the at least one modified beam scans the panel and forms a scribe line in the panel;

tracking changes in a thickness of the panel; and changing a fluence of the beam in response to changes in the thickness of the panel.

* * * * *